United States Patent
Lin et al.

(10) Patent No.: US 8,328,422 B2
(45) Date of Patent: Dec. 11, 2012

(54) COMPONENT FOR LINEAR GUIDEWAY AND METHOD FOR MAKING THE SAME

(75) Inventors: Ming-Yao Lin, Taichung (TW); Chin-Cheng Cheng, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 574 days.

(21) Appl. No.: 12/356,065

(22) Filed: Jan. 19, 2009

(65) Prior Publication Data

US 2010/0183252 A1    Jul. 22, 2010

(51) Int. Cl.
*F16C 29/06* (2006.01)
(52) U.S. Cl. ......................................................... 384/43
(58) Field of Classification Search .............. 384/43–45, 384/49; 464/168
See application file for complete search history.

(56) References Cited

U.S. PATENT DOCUMENTS

| 4,240,673 | A | * | 12/1980 | Ernst et al. | 384/44 |
| 4,828,402 | A | * | 5/1989 | Osawa | 384/45 X |
| 5,622,433 | A | * | 4/1997 | Suzuki et al. | 384/45 |
| 8,167,493 | B2 | * | 5/2012 | Fujii et al. | 384/45 |

* cited by examiner

*Primary Examiner* — Gregory Binda

(57) ABSTRACT

A component for linear guideway and method for making the same, wherein the component is an end cap or a bolt cover which is made by bulk molding compound which is injected into a mold and formed into the desired shape by thermal setting. The component can be an assembly made up of a plurality of members, namely, an inserting member which is provided for passage of rolling elements can be formed simultaneously when the component is molded by plastic injection molding. The inserting member is formed by: injecting metal powder into a first mold and forming into an inserting member with acceptable rigidity and precision; putting the inserting member into a second mold and bulk molding compound; then the die material is formed into the desired component by thermal setting directly on the inserting member.

5 Claims, 6 Drawing Sheets

COMPONENT FOR LINEAR GUIDEWAY AND METHOD FOR MAKING THE SAME

BACKGROUND OF THE INVENTION

1. Field of the Invention

The present invention relates to a component for linear guideway and method for making the same, and more particularly to an end cap or bolt cover which is made of bulk molding compound, or performing a metal inserting member with return path, and then forming a component directly on the inserting member by thermal setting bulk molding compound, so as to form an integral end cap with high strength, speed while low cost.

2. Description of the Prior Art

Most of the components (such as the end cap) of the linear guideway used on a machine working in a high temperature environment are made by wax-lost casting in order to have a high temperature resistance property. Such a wax-lost casting is very complicated, which comprises the following processes:

Wax injection: forming a shell mold by wax injection;

Wax pattern assembly: assembling and designing a casting runner;

Dipping and sand sprinkling: Dipping the component into ceramic slurry and sprinkling sands on it. Dipping and sand sprinkling can only be carried out to form a new layer of ceramic layer and sands after the previous layer of ceramic slurry with the sands cures, and such a process must be repeated for several times since there are plural layers to be done;

Lost wax: melting the wax off the shell mold and the runner to form a hollow shell mold with a cavity;

Preheat: preheat the shell mold with high temperature;

Melting and pouring: melting metal and pouring melted metal liquid into the cavity of the shell mold, and waiting till it cools down;

Shell breaking: breaking the shell and taking out the semifinal products and cutting off the connection between the runners of the semifinal products;

Sand blasting: sand blasting the surface of the semifinal products;

CNC processing: processing the semifinal products with CNC;

Final products: obtaining final products.

During the dipping and sand sprinkling, each layer of ceramic and sand should take almost one day to dry, and then another layer of dipping and sand sprinkling can be carried out, and such operation should be repeated for several times until it reaches the predetermined thickness. Normally, the process of dipping and sand sprinkling should be repeated for 7 times, that is to say that it takes almost 2 months to carry out all the above processes before obtaining a final product. Furthermore, the dimension tolerance of the end cap or other parts made by such technology is almost ±0.05 mm, which is larger than the acceptable tolerance of the linear guideway. Hence, CNC is required to further process the end cap or other parts to the acceptable size, which is not only time consuming but also cost intensive.

On the other hand, it should wait a certain period of time for the product to cool down after melting and pouring until, otherwise, it is likely to produce heat stress which will cause unexpected defects in internal structure of the product, substantially affecting the service life of the product.

In addition, the rolling members are most likely to produce local high temperature when rolling through the return path of the end cap, as a result, the end cap is likely to have tiny cracks at this high temperatures area and will expand outward, and such tiny cracks may impair the structural strength of the end cap.

The present invention has arisen to mitigate and/or obviate the afore-described disadvantages.

SUMMARY OF THE INVENTION

The primary objective of the present invention is to provide a component for linear guideway and method for making the same, wherein the component is end cap or bolt cover and is made by injecting thermal setting bulk molding compound into a mold, this method is quick forming and can be used for mass production, so that the manufacturing time is considerably reduced and so will be the manufacturing cost. The linear guideway comprises a slide block movably mounted on a rail, and at both ends of the slide block are provided the end caps made by the aforementioned method. The rail is provided with a plurality of rolling passages and holes through which fixing bolts can be inserted to fix the rail to a machine table. The resistant temperature of the component made by the bulk molding compound is as high as 149° C.~288° C., which further reduces the possibility of damage caused thermal stress.

Another objective of the present invention is to provide a component for linear guideway, wherein the component is an end cap which is provided with an inserting member. The inserting member has a return passage and is preformed in a first mold, and then put into a second mold, and then injecting bulk molding compound into the second mold to form an integrally formed end cap. Hence, the resistant temperature of the component made by the bulk molding compound is as high as 149° C.~288° C. Furthermore, the steel consumption of the end cap is 50% less than the conventional technology, while the rigidity and precision of the end cap are improved. The inserting member further improves the rigidity of the end cap. As a result, the end cap is less likely to have tiny cracks during the high speed rolling of the rolling elements due to the high rigidity of the return passage, and hence, such design extends the life of the end cap.

Yet another objective of the present invention is to provide a method for making a component for linear guideway, wherein the method for making the component with an inserting member comprises the following steps:

Injection molding of the inserting member comprises:

mixing metal powder with bonding agent and pelletizing the mixture; then injecting the mixture into a cavity of a first mold and forming it into an inserting member.

The part of injection molding of component comprises:

Putting the engaging member into a cavity of a compression type second mold; injecting a thermal setting bulk molding compound into the cavity of the second mold and forming it into the component which is integral with the inserting member; cooling down the second mold 430 and opening it and taking out the final product—an end cap which is consisted of a base and the inserting member integrally engaged in it.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
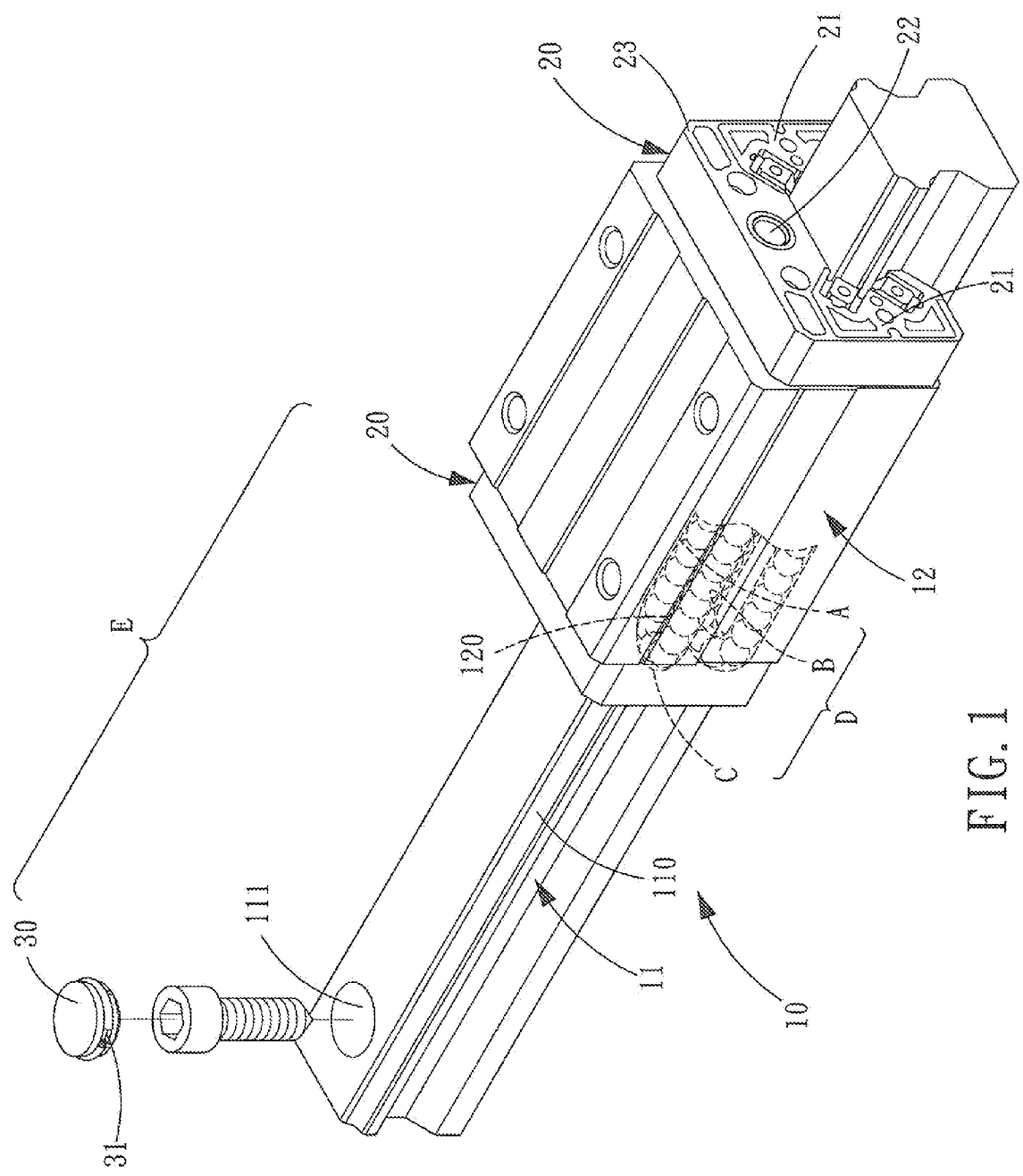
FIG. 1 is a perspective view of a linear guideway in accordance with the present invention.

Referring to FIG. 1, end caps in accordance with the present invention are mounted on a linear guideway 10 which comprises: a rail 11 and a slide block 12 slidably mounted on the rail 11. The rail 11 is an elongated structure and provided with rolling passages 110. The slide block 12 is provided with rolling grooves 120 for cooperating with the rolling passages 110 to define a load path A and further has return holes B which are parallel to the load path A at an interval and penetrates the slide block 12. The end caps 20 are disposed at both ends of the slide block 12 and each have a return path C which is connected with the load path A and the return hole B to form a circulation path D. A plurality of rolling members 13 rolls within the circulation path D between the rail 11 and the slide block 12. In the rail 11 are formed holes 111 for insertion of fixing bolts, and each of the holes 111 is sealed with a bolt cover 30.

Figure 2:
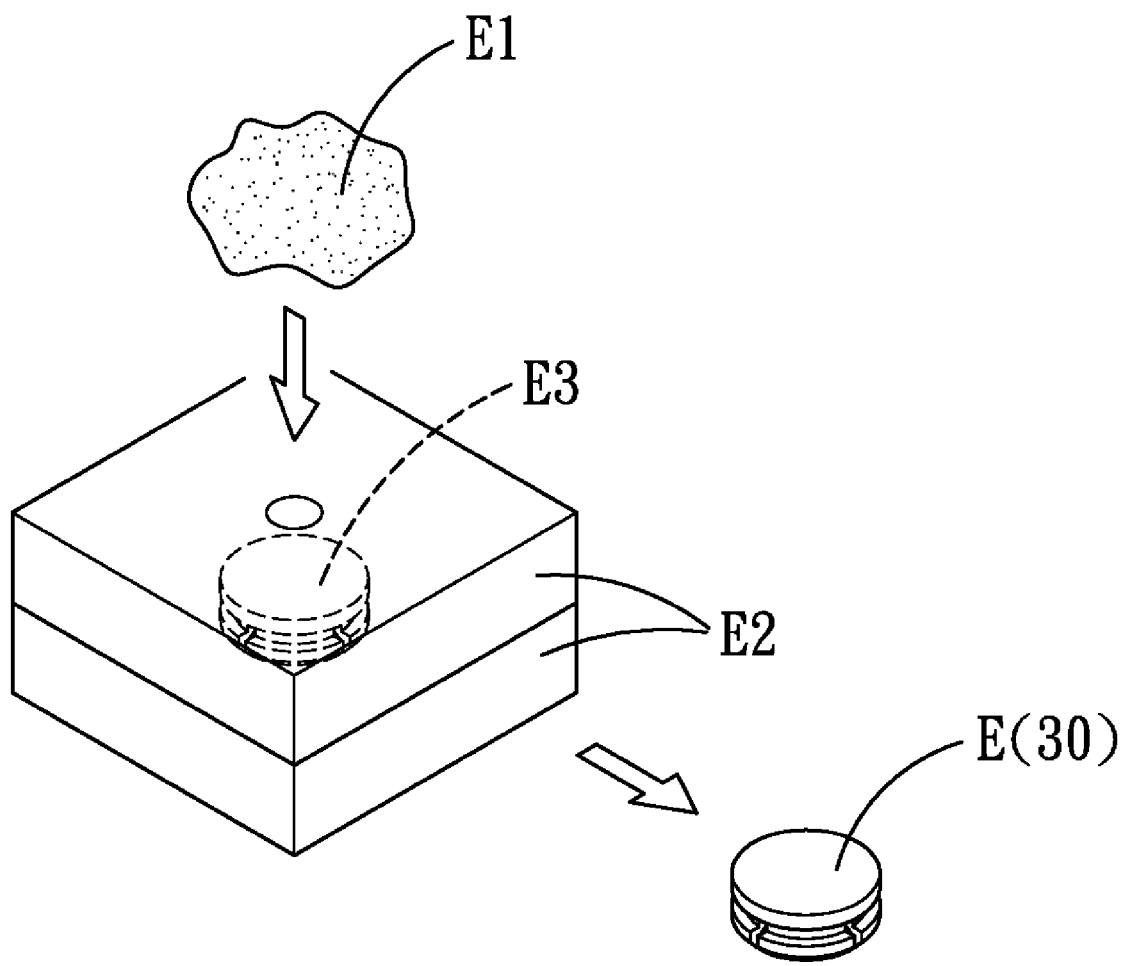
FIG. 2 shows the manufacturing of a component (bolt cover) for a linear guideway in accordance with the present invention.

A component E of the linear guideway can be the end cap 20, the bolt cover 30 or other parts, and it is the bolt cover 30 for example in this embodiment. The bolt cover 30 is disc-shaped and has an annular groove 31 formed in the outer periphery thereof for cooperating with a seal ring to fix the bolt cover 30 into the holes 111. The method for making the bolt cover 30 is shown in FIG. 2, wherein a bulk molding compound (BMC) E1 is injected into a cavity E3 of a mold E2 which is consisted of two halves, and then the die material E1 is formed into the bolt cover 30 by thermal setting.

Figure 3:
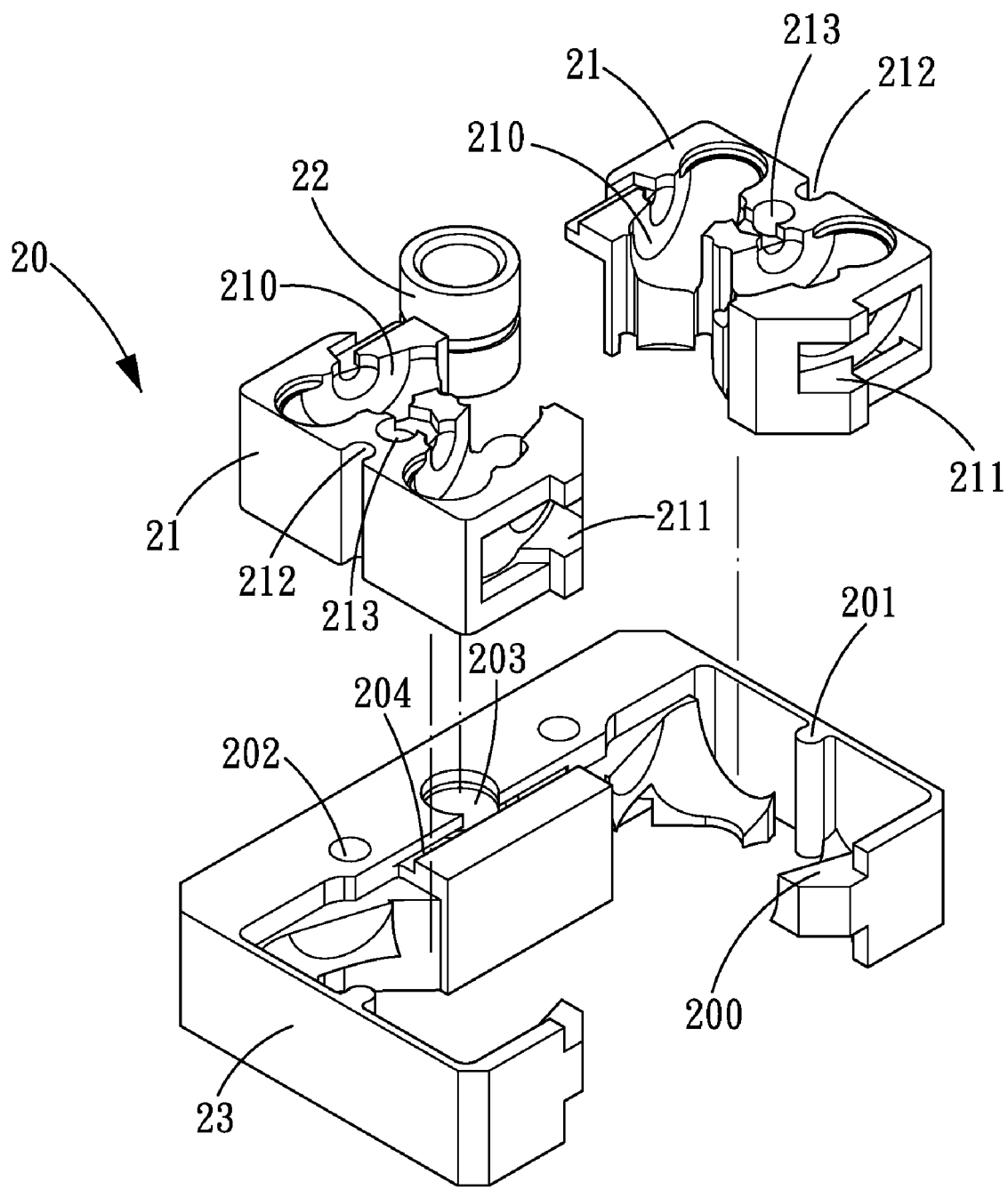
FIG. 3 shows the manufacturing of a component (end cap) for a linear guideway in accordance with the present invention.
Figure 4:
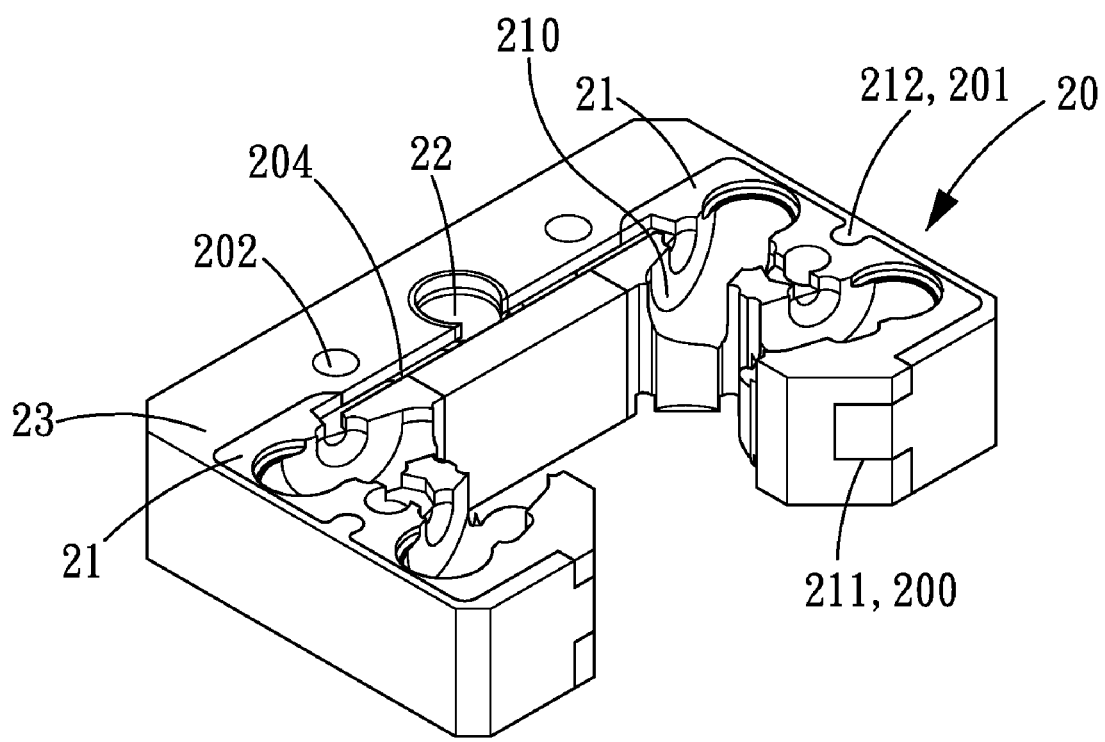
FIG. 4 shows a component (end cap) for a linear guideway in accordance with the present invention.

The method of the present invention can also be used to make a complicated component which is consisted of two or more members, for example, the complicated component is the end cap 20 as shown in FIGS. 3 and 4. The end cap 20 includes an inserting member 21, an oil-guiding member 22 and a base 23.

The inserting member 21 includes at least one return passage 210 to form the return path C and plural engaging portions formed in the outer periphery of the inserting member 21. The engaging portions are: a first horizontal concave engaging portion 211 formed in an outer surface thereof, and a second vertical concave engaging portion 212 formed in another outer surface thereof. The inserting member 21 is further formed with a penetrating hole 213 through which a fixing bolt (not shown) is inserted to fix the inserting member 21 to the slide block 12.

The inserting member 21 is engaged in the base 23 which is provided with a first horizontal convex engaging portion 200 and a second vertical convex engaging portion 201 which are to be engaged with the first horizontal concave engaging portion 211 and the second vertical concave engaging portion 212 of the inserting member 21. The base 23 is further formed with fixing holes 202 in the end surface thereof abutting the slide block 12 for passage of fixing bolts (not shown) for fixing the base 23 to the slide block 12.

The base 23 is further formed with a circular oil feeding hole 203 and an oil guiding groove 204 which is in communication with the return passage 210 and the oil feeding hole 203, so that oil can be fed into the return passage 210 through the oil feeding hole 203 and the oil guiding groove 204. The oil guiding member 22 in the form of a copper nut is disposed in the oil feeding hole 203 to facilitate oil injection.

Figure 5:
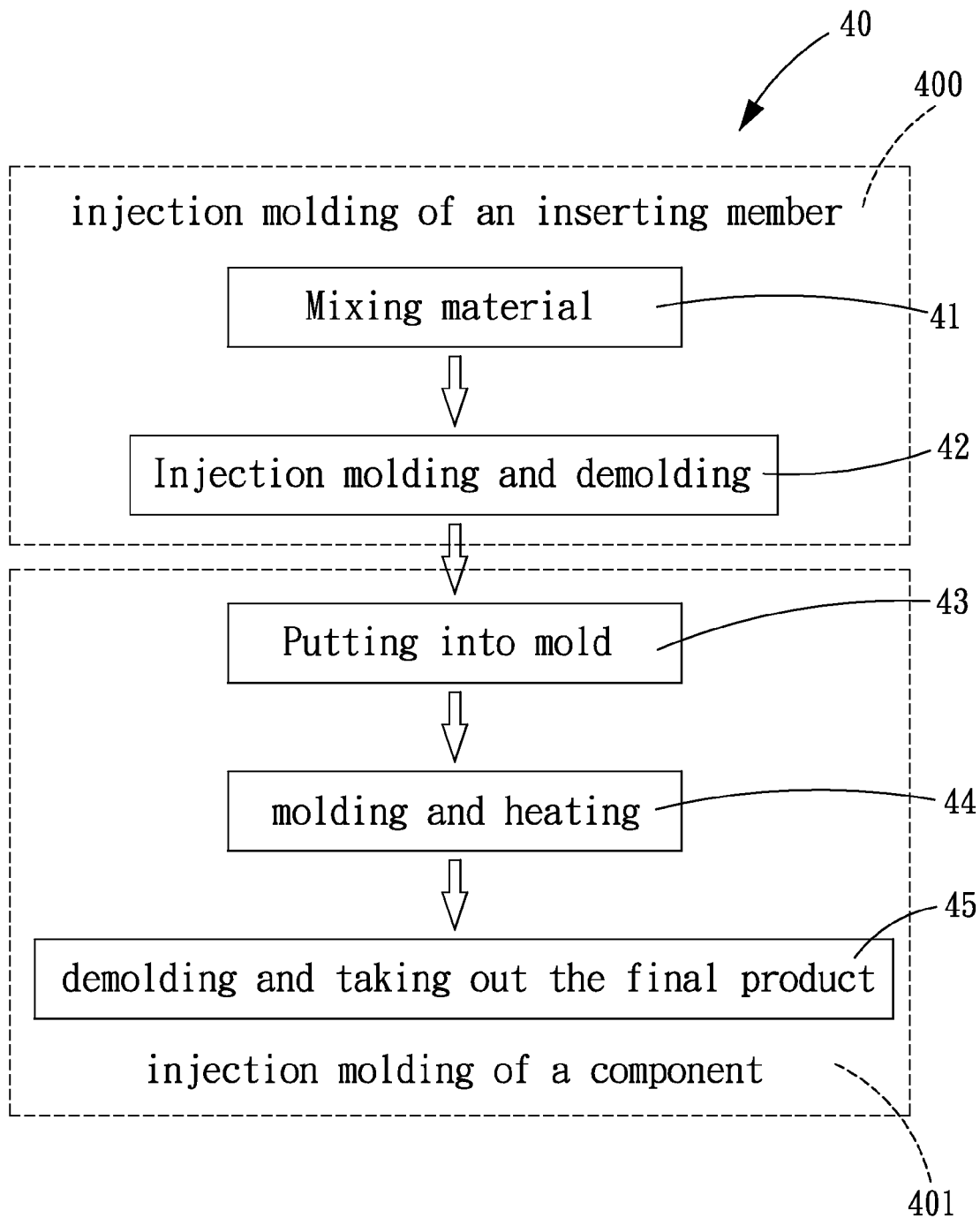
FIG. 5 is a flow chart showing the steps of manufacturing component for a linear guideway in accordance with the present invention.
Figure 6:
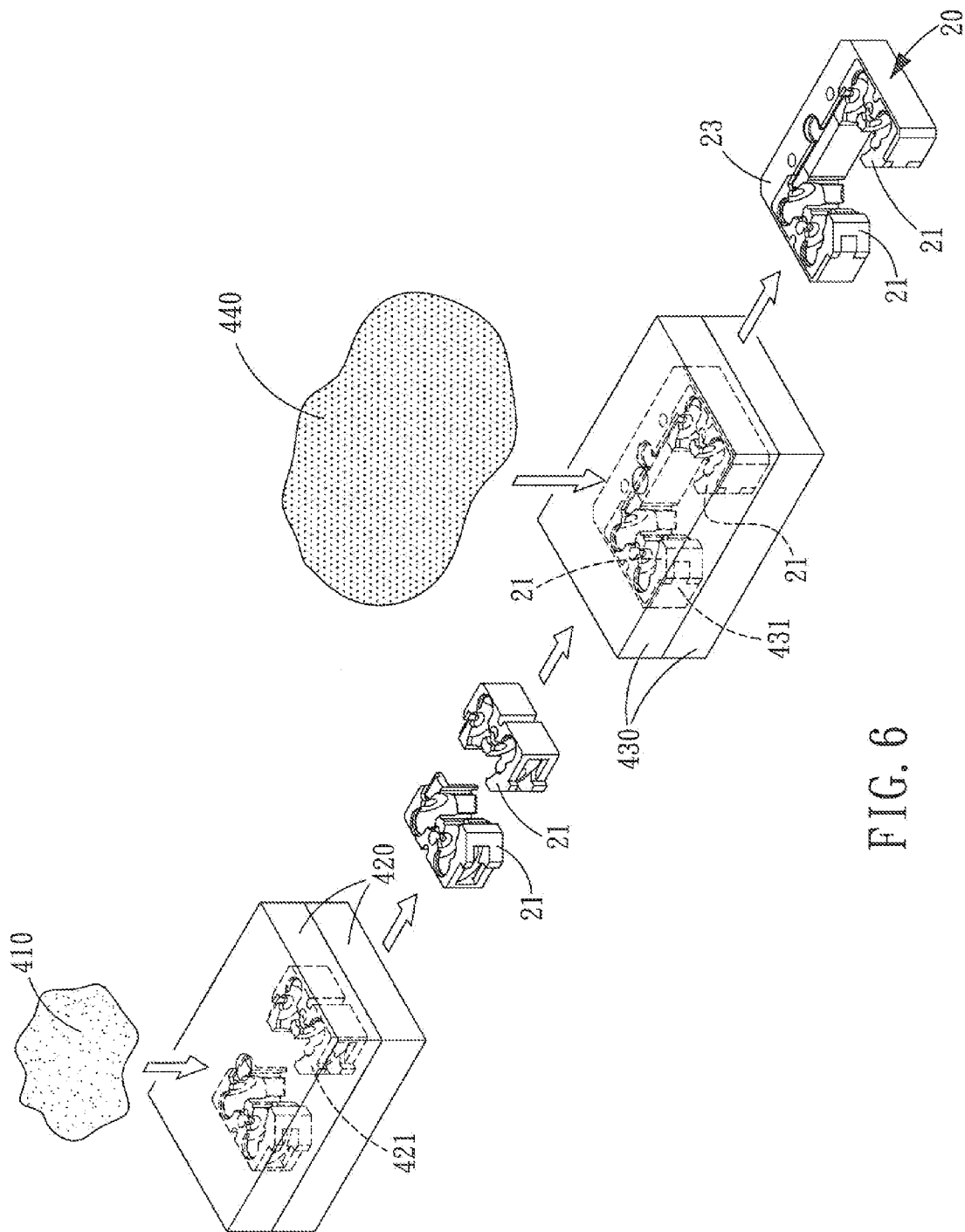
FIG. 6 is an operational view of showing the manufacturing component for a linear guideway in accordance with the present invention.

Referring then to FIGS. 5 and 6, the method 40 in accordance with the present invention for making the end cap comprises: part 400: injection molding of an inserting member, and part 401: injection molding of a component:

Injection molding of the inserting member comprises (as shown in FIG. 5):

Mixing material 41: mixing metal powder 410 with bonding agent and pelletizing the mixture;

Injection molding and demolding 42: injecting the mixture into a cavity 421 of a first mold 420 and forming it into an inserting member 21, and carrying out post treatment which includes: grinding of ingates and deburring.

The part of injection molding of component comprises:

43: Putting into mold: putting the engaging member 21 into a cavity 431 of a compression type second mold 430;

44 molding and heating: injecting a thermal setting bulk molding compound 440 into the cavity 431 of the second mold 430 and forming it into the component E which is integral with the inserting member 21;

45 demolding and taking out the final product: cooling down the second mold, 430 and opening it and taking out the final product—an end cap 20 which is consisted of a base and the inserting member 21 integrally engaged in it.

The metal powder 410 can be selected from the group consisted of Ni—Fe—C alloy, stainless steel alloy, Mn—Cu alloy, and soft magnetic alloy.

The bulk molding compound 440 is a thermal setting material which is selected from a group consisted of unsaturated polyester resin, phenolic resin, Urea resin, epoxy resin, silicone resin, melamine or epoxy insulation. The unsaturated polyester resin is composed of polestar resin, curing agent, fiber, demolding agent, filling material and viscosity increaser. The fiber includes carbon fiber, fiberglass, or metallic fiber, or the combination of the aforementioned fibers. The phenolic resin is made by polymerizing phenol and formaldehyde and is also called Bakelite. The phenolic resin is essentially composed of 30-55% resin, 40-65% filling material, 3-6 color material, a small amount of toughening agent and demolding agent. The Urea resin is a urea-formaldehyde resin with the filling material of cellulose pulp. The epoxy resin is made from epichlorohydrin (C3H5CIO) and bisphenol-A (C15H16O2). The silicone resin is also called polysiloxances which is an organic-inorganic hybrid polymer with the chemical formula [R2SiO]n, where R=organic groups such as methyl, ethyl, and phenyl. These materials consist of an inorganic silicon-oxygen backbone ( ... —Si—O—Si—O—Si—O— ... ) with organic side groups attached to the silicon atoms. The melamine resin is made from Formaldehyde and calcium cyanamide. The epoxy insulation is a thermal setting rein.

The bulk molding compound 440 has many advantages, such as: nice appearance, impact resistance, pressure resistance, deformation resistance, tensile resistance, high capacity, high surface resistance, high insulation capacity, high arc resistance, good microwave property, corrosion resistance, low smoke, low toxicity, stable dimension of final product, low shrinkage and water absorption. The operating temperature of the end cap 20 is 150° C.~200° C., while the resistant temperature of the bulk molding compound is 149° C.~288° C.

The component E made by the method of the present invention has the following advantages:

1, quick formation: no matter the component is made independently by bulk molding compound or together with the inserting member, it can be produced quickly by injection molding.

2, high manufacturing precision: with the high precision injection molding method, the manufacturing tolerance of the component can be precisely controlled.

3, less possibility of thermal stress caused damage: with the design that in the end cap is inserted the high rigidity inserting member, plus the rigid bulk molding compound, it can effectively prolong the service life of the product. In addition, the resistant temperature of the component made by the bulk molding compound is as high as 149° C.~288° C., which further reduces the possibility of damage caused thermal stress.

4, less material cost: with the technology of the bulk molding compound and metal powder injection molding, the steel consumption of the end cap is 50% less than the conventional technology.

While we have shown and described various embodiments in accordance with the present invention, it is clear to those skilled in the art that further embodiments may be made without departing from the scope of the present invention.

What is claimed is:

1. A component for linear guideway comprising:
   an elongated rail with a plurality of rolling passages and holes;
   a slide block movably disposed on the rail and provided with rolling grooves for cooperating with the rolling passages to define a load path, the slide block being further provided with return holes;
   two end caps mounted at both ends of the slide block and each having a return path which is connected with the load path and the return hole to form a circulation path;
   a plurality of rolling members rolling within the circulation path;
   each of the holes of the rail being sealed with a bolt cover;
   wherein the bolt cover is made of bulk molding compound;
   the end caps are made of thermal setting material which is selected from the group consisting of unsaturated polyester resin, phenolic resin, Urea resin, epoxy resin, silicone resin, melamine and epoxy insulation, each of the two end caps is further provided with an inserting member in which is defined the return path, and the inserting members are made of metal which is selected from the group consisting of Ni—Fe—C alloy, stainless steel alloy, Mn—Cu alloy, and soft magnetic alloy.

2. The component for linear guideway as claimed in claim 1, wherein convex and concave engaging portions are formed between the end caps and the inserting members.

3. The component for linear guideway as claimed in claim 1, wherein each of the inserting members is provided with at least one penetrating hole for passage of a fixing bolt.

4. The component for linear guideway as claimed in claim 1, wherein each of the end caps is provided with at least one fixing hole for insertion of a fixing bolt.

5. The component for linear guideway as claimed in claim 1, wherein each of the end caps is further formed with an oil feeding hole and an oil guiding groove which is in communication with the return path and the oil feeding hole, so that oil can be fed into the return passage through the oil feeding hole and the oil guiding groove.

* * * * *